(12) United States Patent
McAlvin et al.

(10) Patent No.: US 7,326,752 B2
(45) Date of Patent: *Feb. 5, 2008

(54) STYRENE-FREE UNSATURATED POLYESTER RESIN COMPOSITIONS FOR COATING APPLICATIONS

(75) Inventors: John E. McAlvin, Collierville, TN (US); Daniel A. Oakley, Collierville, TN (US); Paul Taylor Hutson, Memphis, TN (US); David J. Zwissler, Arlington, TN (US); Thomas J. Folda, Collierville, TN (US)

(73) Assignee: AOC, LLC, Collierville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/789,245

(22) Filed: Feb. 27, 2004

(65) Prior Publication Data

US 2004/0220340 A1    Nov. 4, 2004

Related U.S. Application Data

(60) Provisional application No. 60/451,369, filed on Feb. 28, 2003.

(51) Int. Cl.
*C08F 8/00* (2006.01)
*C08L 33/04* (2006.01)
*C08L 33/06* (2006.01)
*C08L 35/00* (2006.01)
*C08L 35/02* (2006.01)

(52) U.S. Cl. ............. 525/192; 525/193; 525/207; 525/222; 525/224

(58) Field of Classification Search ......... 525/192, 525/193, 207, 222, 224
See application file for complete search history.

(56) References Cited

U.S. PATENT DOCUMENTS

| | | | |
|---|---|---|---|
| 4,163,093 A | 7/1979 | Hess et al. | |
| 4,390,662 A | 6/1983 | Ando et al. | |
| 5,369,139 A * | 11/1994 | Boeckeler et al. | 522/21 |
| 5,736,090 A | 4/1998 | Yamamoto et al. | |
| 5,739,240 A | 4/1998 | Smith | |
| 5,747,597 A | 5/1998 | Fujita et al. | |
| 5,773,531 A | 6/1998 | Smith | |
| 5,908,875 A | 6/1999 | Smith | |
| 6,037,385 A | 3/2000 | Smith | |
| 6,277,939 B1 | 8/2001 | Smith | |
| 6,395,822 B1 | 5/2002 | Edgington | |
| 6,468,662 B1 | 10/2002 | Nava | |
| 6,777,458 B1 * | 8/2004 | Jaworek et al. | 522/1 |
| 6,992,140 B2 * | 1/2006 | Kosono et al. | 525/164 |
| 2004/0010061 A1 * | 1/2004 | Hewitt et al. | 524/18 |

FOREIGN PATENT DOCUMENTS

WO    WO 99/23122    5/1999

* cited by examiner

*Primary Examiner*—Nathan M. Nutter
(74) *Attorney, Agent, or Firm*—Baker, Donelson, Bearman, Caldwell & Berkowitz, PC

(57) ABSTRACT

Styrene-free unsaturated polyester resin compositions are provided which contain low amounts of hazardous air pollutants, good mechanical and physical properties and good weathering characteristics. A process for the manufacture of these resin compositions is also provided.

22 Claims, No Drawings

STYRENE-FREE UNSATURATED POLYESTER RESIN COMPOSITIONS FOR COATING APPLICATIONS

This application claims the benefit of U.S. Provisional Application Ser. No. 60/451,369, filed Feb. 28, 2003.

TECHNICAL FIELD

The present invention relates to styrene-free polyester resin compositions. In a more specific aspect, this invention relates to styrene-free unsaturated polyester resin compositions for coating applications. This invention also relates to a process for the manufacture of these polyester resin compositions.

BACKGROUND OF THE INVENTION

Thermoset resins, including unsaturated polyesters, are commonly employed in a variety of fabrications, such as casting materials, fiber reinforced materials and coatings. Unsaturated polyester resins are the condensation products of dicarboxylic acids or anhydrides with difunctional alcohols, typically dissolved in a reactive diluent such as styrene. Since the commercial inception of unsaturated polyester resins, styrene has been a primary reactive diluent due to its low cost, availability, ease of use and resulting mechanical and physical properties. However, in recent years, government regulations have restricted styrene emissions in open molding facilities, citing harmful environmental and health effects associated with styrene.

A number of alternatives has been sought to reduce emissions and as substitutes for styrene. The addition of paraffin to unsaturated polyester resins has been shown to reduce emissions by forming a thin film on the resin surface. While suitable for some applications, this solution is unacceptable in others due to a decreased interlaminate adhesion. In most cases, low volatile acrylate and methacrylate monomers have been inadequate as replacements for styrene in unsaturated polyester resins since atmospheric oxygen severely retards polymerization, resulting in an under-cured "tacky" surface. Furthermore, the poor copolymerization of most acrylates and methacrylates with maleate and fumarate moieties in the polyester backbone often results in inferior mechanical properties compared to styrenated unsaturated polyester resins.

Previous patents have described non-styrenated unsaturated polyester resin compositions. For example, U.S. Pat. No. 5,747,597 describes a curable resin comprised of an unsaturated polyester, an epoxymethacrylate and/or an urethane methacrylate, combined with oligoalkyl ether-monoalkoxy methacrylates. The resin is described in many cases to air dry (i.e., "dry-to-touch") after the addition of wax, free radical initiator, catalyst and exposure to elevated temperatures (130-145° F.). Tensile testing of the cast resin reveals high elongation and low strength properties, which is in sharp contrast to data measured using the same base polymers dissolved in styrene that demonstrated considerably higher tensile strengths.

European Patent Publication No. WO 99/23122 demonstrates the use of a hydroxyethyl methyl methacrylate, hydroxyethyl propyl methacrylate and/or urethane hydroxyethyl methacrylate with polyesters and vinyl esters. The resulting tensile and flexural properties of the cured products are comparable to styrenated unsaturated resins, but the tack-free cure in thin films and thin film laminates tends to be a problem with these resins. Additionally, the storage stability of these resins tends to be poor.

Other related U.S. patents are U.S. Pat. Nos. 5,908,875; 5,739,240; 6,277,939; 5,773,531 and 6,037,385.

An ongoing goal in the unsaturated polyester industry has been to develop improved non-styrenated, free radical curable laminating and coating resins. Desired properties include processing similar to current styrenated resins, benefits in mechanical and physical properties and tack-free cure in thin film laminates and coatings.

Unsaturated polyester coatings known as gel coats present a problem with high emissions since they are usually applied by spray-up, and the surface area to volume ratio of the coating on the composite part is very high. Some publications have described low styrene or low hazardous air pollutant unsaturated polyester coating resins, but very few publications have described low volatility gel coats which are free of components that are analogues of styrene. Compounds related to styrene (such as alpha-methyl styrene, vinyl toluene, divinyl benzene and the like) similarly exhibit photochemical reactivity and volatility. These negative features make these compounds undesirable for use in a coating resin. There are major obstacles in successfully preparing and utilizing low vapor pressure polyester gel coats lacking styrene or analogs of styrene.

SUMMARY OF THE INVENTION

Briefly described, the present invention provides curable styrene-free unsaturated polyester resin compositions which contain low amounts (i.e., less than about 3 weight percent) of hazardous air pollutants (HAP). The resin compositions of this invention exhibit (a) mechanical and physical properties that are equivalent to or better than styrene-containing unsaturated polyester resin compositions and (b) efficient cure in a thin film under an air atmosphere at ambient temperatures. The resin compositions of this invention have good weathering characteristics as demonstrated by ultraviolet (UV) stability and blister resistance in aqueous environments. The present invention also provides a process for the manufacture of these resin compositions.

Accordingly, an object of this invention is to provide unsaturated polyester resin compositions.

Another object of this invention is to provide styrene-free unsaturated polyester resin compositions.

Another object of this invention is to provide styrene-free unsaturated polyester resin compositions which contain low amounts of hazardous air pollutants.

Another object of this invention is to provide styrene-free unsaturated polyester resin compositions having mechanical and physical properties that are equivalent to or better than styrene-containing unsaturated polyester resin compositions.

Another object of this invention is to provide styrene-free unsaturated polyester resin compositions having efficient cure in a thin film under an air atmosphere at ambient temperatures.

Another object of this invention is to provide styrene-free unsaturated polyester resin compositions having good weathering characteristics as demonstrated by ultraviolet stability and blister resistance in aqueous environments.

Still another object of this invention is to provide a process for the manufacture of unsaturated polyester resin compositions.

Still another object of this invention is to provide a process for the manufacture of styrene-free unsaturated polyester resin compositions.

Still another object of this invention is to provide a process for the manufacture of styrene-free unsaturated polyester resin compositions which contain low amounts of hazardous air pollutants.

Still another object of this invention is to provide a process for the manufacture of styrene-free unsaturated polyester resin compositions having mechanical and physical properties that are equivalent to or better than styrene-containing unsaturated polyester resin compositions.

Still another object of this invention is to provide a process for the manufacture of styrene-free unsaturated polyester resin compositions having efficient cure in a thin film under an air atmosphere at ambient temperatures.

Still another object of this invention is to provide a process for the manufacture of styrene-free unsaturated polyester resin compositions having good weathering characteristics as demonstrated by ultraviolet stability and blister resistance in aqueous environments.

These and other objects, features and advantages of this invention will become apparent from the following detailed description.

DETAILED DESCRIPTION OF THE INVENTION

The present invention provides new and unique styrene-free unsaturated polyester resin compositions which comprise the following four essential components: (1) an unsaturated polyester; (2) a urethane (meth)acrylate; (3) a hydroxyl-functionalized (meth)acrylate monomer; and (4) a multifunctional (meth)acrylate monomer. In addition to the four essential components, various additives enable the formulation of the curable composition to a gel coat. Additionally, more than one of each essential component can be used in the resin compositions of this invention.

The present invention also provides a process for the manufacture of these new and unique styrene-free unsaturated polyester resin compositions.

Whenever used in this application, the term "styrene-free" will be understood to mean that the resin compositions of this invention contain neither styrene nor an analog of styrene, the term "(meth)acrylate" will be understood to include both "acrylate" and "methacrylate" and the term "molecular weight" will be understood to mean weight average molecular weight.

The procedure for the synthesis of unsaturated polyesters is well known to those skilled in the art. Typically, these polymers are the condensation products of multifunctional carboxylic acids and/or their corresponding anhydrides with multifunctional alcohols. Less common, but still utilized in the polyester industry are monofunctional carboxylic acids, alcohols and epoxies. In the present invention, the preferred concentration of the first essential component, an unsaturated polyester, is from about 20 to about 70 percent by weight in the curable resin composition.

Suitable unsaturated acids or anhydrides used in the synthesis of polyester resins include maleic anhydride, maleic acid, fumaric acid, itaconic acid and related derivatives. These are preferably charged in at least 10 mole percent of the total carboxylic acid and anhydride content. Saturated multifunctional carboxylic acids or anhydrides that may be used include phthalic acid, isophthalic acid, terephthalic acid, hexahydrophthalic acid, tetrahydrophthalic acid, cyclohexane dicarboxylic acid, adipic acid, succinic acid, malonic acid, nadic acid, trimellitic acid, pyromellitic acid, the related derivatives of such compounds and their corresponding anhydrides. The nadic ester of nadic anhydride is commonly synthesized in situ by reaction of cyclopentadiene with the fumarate and maleate moieties in the polyester backbone. In this application, the term "saturated" refers to compounds that are relatively unreactive towards traditional methods of free radical polymerization. Some saturated monofunctional carboxylic acids used in polyester synthesis include benzoic acid, 2-ethylhexanoic acid and lauric acid. The preferred concentration of the total saturated carboxylic acid and anhydride equals about 10 to about 90 mole percent of the total carboxylic acid and anhydride content.

The acids and anhydrides described above may be reacted with any combination of monofunctional and/or multifunctional alcohols. Examples of suitable multifunctional alcohols used in this process are ethylene glycol, diethylene glycol, triethylene glycol, propylene glycol, dipropylene glycol, tripropylene glycol, neopentyl glycol, butane diol, butyl ethyl propane diol, trimethylol propane, hexane diol, cyclohexane dimethanol, glycerol, pentaerythritol and related derivatives including polyether polyols and other polymeric analogs. Examples of monofunctional alcohols that may be used are benzyl alcohol, 2-ethyl hexanol, lauryl alcohol and cyclohexanol. The amount of total monofunctional and multifunctional alcohol charged in the preferred unsaturated polyester composition is from about 90 to about 120 mole percent relative to the total carboxylic acid and anhydride content.

Dicyclopentadiene (DCPD) may optionally be used in the preparation of the unsaturated polyester resin. The resulting product may be an end-capped polymer where DCPD is used to react with maleic acid, or by manipulation of reaction conditions known to those skilled in the art, promoting formation of a nadic ester-containing polymer. If used, the preferred amount of DCPD in the polyester reaction mixture may range up to about 45 percent by weight.

In many cases, the unsaturation in polyesters which is reactive towards free-radical polymerization is confined to maleate and fumarate moieties in the polymer backbone. Addition of unsaturation at the polymer chain end to polymerize with the reactive diluent results in enhanced mechanical, physical and curing properties. The unsaturated polyester resin may also be modified with a monofunctional epoxy compound such as allyl glycidyl ether, glycidyl methacrylate or related derivatives. In addition, allyl ether groups may also be introduced to the polymer by reaction of trimethylolpropane diallyl ether, allyl pentaerythritol or polymeric allyl glycidyl ether. The preferred concentration of the aforementioned monofunctional epoxies and/or functionalized allyl ethers in the charge of polyester synthesis is up to about 30 percent by weight.

The unsaturated polyester in the present invention may be prepared by a single or multi-stage procedure. Suitable reaction temperatures are 150-240° C., or more preferably 180-220° C. This procedure may optionally include catalysts for esterification and isomerization. The catalysts for esterification are well known to those skilled in the art and include a variety of acids, transition metal catalysts and tin compounds. These esterification catalysts are preferably used at levels of up to about 1 percent by weight of the polyester synthesis charge. Examples of suitable isomerization catalysts are acids, nitrogen containing compounds, amines and amides. These are typically used at levels of up to about 1 percent by weight of the polyester synthesis charge.

The resulting polymeric product in the present invention has a weight average molecular weight of from about 1000 to about 12000, preferably about 1500 to about 8000. Following the synthesis, the unsaturated polyester of the present invention is preferably dissolved in a vinyl monomer reactive diluent, such as a multifunctional acrylate, a hydroxyl-functionalized acrylate or a urethane(meth)acrylate. The reactive vinyl monomer diluent may range from about 10 to about 80 percent by weight of the mixture with the unsaturated polyester.

The urethane(meth)acrylate (second essential component) of the resin composition is a product of a difunctional or polyfunctional isocyanate with a hydroxyl-functionalized (meth)acrylate. The methods of preparation of urethane (meth)acrylates are well known to those skilled in the art. Examples of isocyantes that may be employed in this invention are 2,4-toluene diisocyanate, 2,6-toluene diisocyanate (TDI), 4,4'-diphenylmethane diisocyanate (MDI), 1,5-naphthalene diisocyanate (NDI), tetramethylxylylenediisocyanate (TMXDI), 4,6'-xylene diisocyanate (XDI), paraphenylene diisocyanate (PPDI), 3,3'-tolidene 4,4'-diisocyanate (TODI), 3,3'-dimethyl-diphenylmethane 4,4'-diisocyanate (DDI) and their adducts and polymeric forms.

More preferred precursors to the urethane(meth)acrylate in the present invention are aliphatic isocyanates including isophorone diisocyanate (IPDI), hexamethylene diisocyanate (HDI), 4,4'-dicyclohexylmethane diisocyanate (HI2MDI), cyclohexyl diisocyanate (CHDI), 2,2,4-trimethyl-1,6-hexamethylene diisocyanate (TMDI), and their adducts and polymeric forms. Aliphatic isocyanates are preferred for this invention since they result in products that exhibit superior UV resistance, which is a critical property in many coating resin applications.

Prior to reaction with hydroxyl-functionalized (meth) acrylates, these isocyantes may optionally; be "chain extended" by reaction with any of the aforementioned multifunctional alcohols. Examples of hydroxyl-functionalized (meth)acrylates that may be used in the preparation of the urethane(meth)acrylate or as a monomeric reactive diluent are 2-hydroxyethyl methacrylate (HEMA), 2-hydroxypropyl methacrylate (HPMA), 2-hydroxyethyl acrylate (HEA), 2-hydroxypropyl acrylate (HPA) and related compounds. The preferred amount of hydroxyl-functionalized (meth)acrylate used in the urethane(meth)acrylate synthesis is from about 80 to about 120 mole percent relative to the isocyanate. The urethane(meth)acrylate may optionally be modified to contain some isocyanurate groups with the addition of an appropriate catalyst such as tris(dimethylaminomethyl)phenol. The preferred concentration of this second essential component, a urethane(meth)acrylate, in the present invention is from about 10 to about 40 percent by weight.

The preferred concentration of the third essential component, a monomeric reactive diluent hydroxyl-functionalized (meth)acrylate, in the present invention is from about 5 to about 40 percent by weight. This component may include one or any combination of the aforementioned hydroxyl-functionalized (meth)acrylates.

Multifunctional (meth)acrylate monomers that may be used in the resin compositions of this invention are 1,4-butanediol diacrylate (BDDA), 1,6-hexanediol diacrylate (HDDA), diethylene glycol diacrylate, 1,3-butylene glycol diacrylate, neopentyl glycol diacrylate, cyclohexane dimethanol diacrylate, dipropylene glycol diacrylate, ethoxylated bisphenol A diacrylate, trimethylolpropane triacrylate, pentaerythritol triacrylate, pentaerythritol tetraacrylate, their corresponding methacrylate analogues, and all other related derivatives. In some cases, a combination of these multifunctional (meth)acrylates may be used to maximize performance and cure characteristics. The preferred concentration of this fourth essential component, a multifunctional (meth)acrylate monomer, in the present invention is from about 5 to about 40 percent by weight.

Additives may be used in formulating the curable resin composition of the present invention to a gel coat. The additives and their functions are well known in the industry, examples of which are thixotropic additives, pigments, suppressants, air release agents, fillers, adhesion promoters, inhibitors, leveling agents, wetting agents, adhesion promoters, UV absorbers and light stabilizers.

Thixotropic agents that are useful in this invention include fumed silica, organoclays, inorganic clays and precipitated silica. Multifunctional alcohols are commonly used to enhance thixotropic properties. If used, the preferred level of thixotropic agent is up to about 10 percent by weight. The thixotropic enhancer is often used at levels of up to about 2 percent by weight.

Pigments that may be used with this invention may be organic or inorganic, such as titanium dioxide, carbon black, iron oxides, phthalocyanine blue and quinacridone red. These pigments are often dispersed in a vehicle resin, and the level of pigment in this invention may range up to about 40 percent by weight.

Suppressants to reduce emissions and enhance cure time include waxes, polyethers, polysiloxanes and various block copolymers, and these may be used at levels of up to about 5; percent by weight. Air release agents are commonly available and may be used at levels of up to about 1 percent by weight.

The present invention may also contain fillers such as talc, alumina trihydrate, calcium sulfate, calcium carbonate, magnesium sulfate, magnesium carbonate, barium sulfate and the like. These fillers may be present at levels of up to about 40 percent by weight. Leveling agents such as acrylic resins, fluorocarbons, fluoropolymers and silicones may be added at levels of up to about 2 percent by weight.

Wetting agents may also be used, such as boric acid esters, phosphate esters, fatty acid salts, polyethers and others. These agents may be used at levels of up to about 2 percent by weight.

Adhesion promoters such as silanes may be used in amounts of up to about 2 percent by weight in the formulated gel coat. Light stabilizers such as hindered amines, as well as UV absorbers such as benzotriazoles and benzophenones, may be formulated in this invention at levels of up to about 10 percent by weight.

The resin compositions of this invention may be cured by a number of free-radical initiators, such as organic peroxide and azo-type initiators. Peroxide initiators include diacylperoxides, hydroperoxides, ketone peroxides, peroxyesters, peroxyketals, dialkyl peroxides, alkyl peresters and percarbonates. Azo-type initiators include azobisisobutyronitrile (AIBN) and related compounds. These initiators are preferably used in the range of from about 1 to about 3 percent by weight. These resin compositions may optionally be cured by UV or electron beam.

Metal carboxylates, such as cobalt naphthenate or cobalt octoate are often employed to catalyze the free-radical reaction. Zinc, iron, vanadium, manganese, zirconium, calcium and other transition metal compounds are also commonly used for this process. Nitrogen-containing compounds including derivatives of aniline, various amides, aromatic and aliphatic amines are also used to promote the free radical reaction. These metal carboxylates and nitrogen-containing compounds and combinations thereof are usually added to the resin composition at levels of up to about 5 percent by weight.

Inhibitors such as hydroquinone, parabenzoquinone, toluhydroquinone, 4-tert butylcatechol and related derivatives may be added to increase shelf stability and adjust gel time. Copper naphthenate may also be used for the same function. Such compounds and combinations thereof are added to the resin composition at levels of about 0.0005 to about 1 percent by weight.

The relatively strict mechanical property requirements of gel coats are met or exceeded with the resin compositions described in this invention. These include properties such as heat distortion temperature (HDT)$\geq$70° C., flexural strength$\geq$14,000 psi, tensile strength$\geq$7,000 psi and barcol hardness$\geq$35. In addition, products manufactured with the unsaturated polyester resin gel coat compositions of the present invention exhibit superior UV resistance (as compared to standard styrenated unsaturated polyester gel coats), and enhanced blister resistance in aqueous environments. Furthermore, since each of the four essential components have very low vapor pressures (less than 0.1 mm Hg at 20° C.), this invention allows fabricators in open mold applications to achieve low emissions of volatile organic compounds and hazardous air pollutants.

The mechanical properties of the cured products obtained from this invention are equal to or exceed that of standard styrene-containing unsaturated polyester gel coats. Although the invention was designed to meet the strict requirements needed for gel coats, the resin compositions of this invention may be useful in a variety of other applications and fabrication methods. These include cast polymers, filled and unfilled glass or carbon fiber reinforced laminating resins, compression molding, pultrusion, resin transfer molding and other applications where curable resin compositions are used.

The present invention is further illustrated by the following examples which are illustrative of certain embodiments designed to teach those of ordinary skill in the art how to practice the invention and to represent the best mode contemplated for practicing the invention.

In the following examples, the term "parts" indicates parts by weight. Several of the examples were evaluated for performance with UV exposure, hydrolytic stability, and thin film cure. Resins were also evaluated as ⅛-inch clear cast samples for mechanical properties, which were cured with 1.25% MEKP, followed by a post cure for five hours at 100° C. The results of mechanical testing demonstrate acceptable properties. All of the following examples demonstrated excellent shelf stability in accelerated testing (>30 days at 50° C.) without gel formation.

Gloss and color retention of several examples were evaluated and compared to styrenated gel coats in accelerated weather testing using a Q-UV weather-o-meter. Test specimens were constructed by applying a 20-mil thickness cured film of the examples on a glass plate. After thin film cure was achieved, two plies of 1½ ounce fiberglass mat and a commonly available marine-grade polyester resin were used to construct the reinforcing laminate. After cure, the specimens were de-molded with initial color and gloss readings taken. The specimens were exposed in the weather-o-meter using UV-A 340 nm bulbs and UV-B 313 nm bulbs. Gloss and color readings were taken periodically during the exposure period, and the results illustrate superior performance compared to styrenated gel coats.

The hydrolytic stability of several examples was evaluated and compared to styrenated gel coats by water resistance testing. Test specimens were constructed by applying a 20-mil thickness cured film of the examples on a glass plate. After thin film cure was achieved, two plies of 1½ ounce fiberglass mat and a commonly available marine-grade polyester resin were used to construct the reinforcing laminate. After cure, the specimens were de-molded and exposed to boiling water for a period of 100 hours. The specimens were then rated for resistance to blistering, cracking, fiber prominence, color change and loss of gloss.

EXAMPLE 1

A mechanically stirred reaction vessel was charged with 43 parts neopentyl glycol and 5 parts water to make a neopentyl glycol/water slurry, 3 parts trimethylol propane, 31 parts isophthalic acid, and 0.03 parts butylstannoic acid. The reaction mixture was heated to 205° C. under an atmosphere of nitrogen until an acid number of less than 10 was reached, at which time the vessel was then cooled to 150° C. Molten maleic anhydride (23 parts) and 0.23 parts piperidine were then delivered to the reactor. The mixture was then heated to 185° C. and reacted until an acid number of 26 was obtained. The viscosity of the polymer was 23 Poise at 150° C. measured by a cone and plate viscometer. The polymer had Mw=6200, Mn=2300 and Mw/Mn=2.7. The liquid polymer was dissolved in a vinyl monomer as described below.

EXAMPLE 2

The polymer of Example 1 (80 parts) was dissolved in 20 parts trimethylol propane triacrylate (TMPTA). The following inhibitors were delivered to the reactive diluent to obtain the desired concentration in the polymer solution: 5 ppm 8% copper naphthenate and 50 ppm methyl ether hydroquinone.

EXAMPLE 3

A reactor was charged with 22 parts hexahydrophthalic anhydride, 25 parts maleic anhydride, 3 parts trimethylol propane, 4 parts propylene glycol, 32 parts neopentyl glycol, 8 parts 2-ethyl hexanol, 0.002 parts hydroquinone and 0.03 parts butylstannoic acid. The vessel was mechanically stirred and heated to 205° C. under an atmosphere of nitrogen until an acid number of 15 was obtained. The viscosity of the polymer was 20 Poise measured on a cone and plate viscometer at 120° C. The polymer had Mw=4700, Mn=1800 and Mw/Mn=2.6. The liquid polymer was dissolved in a vinyl monomer as described below.

EXAMPLE 4

The polymer of Example 3 (80 parts) was dissolved in 20 parts hexanediol diacrylate (HDDA). The following inhibitors were delivered to the reactive diluent to obtain the desired concentration in the polymer solution: 15 ppm toluhydroquinone and 25 ppm butylated hydroxytoluene.

EXAMPLE 5

The polymer of Example 3 (80 parts) was dissolved in 20 parts trimethylol propane triacrylate (TMPTA). The following inhibitors were delivered to the reactive diluent to obtain the desired concentration in the polymer solution: 15 ppm toluhydroquinone and 25 ppm butylated hydroxytoluene.

EXAMPLE 6

A mechanically stirred reaction vessel charged with 362 parts dicyclopentadiene, 1.9 parts dimethyl acetoacetamide, 0.08 parts hydroquinone and 52 parts of water was heated to 80° C. under an atmosphere of nitrogen. Maleic anhydride (256 parts) was added to the vessel, and the mixture was heated at 140° C. for one hour before addition of 39 parts of ethylene glycol and 91 parts of diethylene glycol. The mixture was then heated at 215° C. until an acid value of 25 was obtained. The viscosity of the polymer was 30 Poise measured on a cone and plate viscometer at 90° C. The polymer had Mw=2500, Mn=840 and Mw/Mn=3.0. The liquid polymer was dissolved in a vinyl monomer as described below.

EXAMPLE 7

The polymer of Example 6 (80 parts) was dissolved in 20 parts hexanediol diacrylate (HDDA). The following inhibitors were delivered to the reactive diluent to obtain the desired concentration in the polymer solution: 50 ppm tert-butyl catechol, 80 ppm mono tert-butyl hydroquinone and 100 ppm 1,4-naphthoquinone.

EXAMPLE 8

The polymer of Example 6 (80 parts) was dissolved in 20 parts butanediol diacrylate (BDDA). The following inhibitors were delivered to the reactive diluent to obtain the desired concentration in the polymer solution: 50 ppm tert-butyl catechol, 80 ppm mono tert-butyl hydroquinone and 100 ppm 1,4-naphthoquinone.

EXAMPLE 9

The polymer of Example 6 (80 parts) was dissolved in 20 parts trimethylol propane triacrylate (TMPTA). The following inhibitors were delivered to the reactive diluent to obtain the desired concentration in the polymer solution: 50 ppm tert-butyl catechol, 80 ppm mono tert-butyl hydroquinone and 100 ppm 1,4-naphthoquinone.

EXAMPLE 10

A reactor was charged with 23 parts hexahydrophthalic anhydride, 24 parts maleic anhydride, 4 parts trimethylol propane, 4 parts propylene glycol, 33 parts neopentyl glycol, 0.002 parts hydroquinone and 0.03 parts butylstannoic acid. The vessel was mechanically stirred and heated to 205° C. under an atmosphere of nitrogen until an acid number of 50 was obtained. The mixture was cooled to 130° C., and 0.1 parts dimethyl benzyl amine and 8 parts allyl glycidyl ether were added. The mixture was stirred until an acid number of 18 was obtained. The viscosity of the polymer was 18.5 Poise measured on a cone and plate viscometer at 120° C. The polymer had $M_w$=3200, $M_n$=1200 and $M_w/M_n$=2.6. The liquid polymer was dissolved in a vinyl monomer as described below.

EXAMPLE 11

The polymer of Example 10 (80 parts) was dissolved in 20 parts trimethylol propane triacrylate (TMPTA). The following inhibitors were delivered to the reactive diluent to obtain the desired concentration in the polymer solution: 15 ppm toluhydroquinone and 25 ppm butylated hydroxytoluene.

EXAMPLE 12

A mechanically stirred reaction vessel was charged with 17 parts hexanediol diacrylate, 51 parts 2-hydroxypropyl methacrylate, 0.01 parts parabenzoquinone, 0.05 parts butylated hydroxytoluene and 0.1 parts dibutyltin dilaurate. Isophorone diisocyanate (33 parts), available as Desmodur I, was charged dropwise over a period of thirty minutes. The mixture stirred until an isocyanate content of less than 0.3 percent was obtained at which time 0.005 parts hydroquinone was added.

EXAMPLE 13

A mechanically stirred reaction vessel was charged with 17 parts butanediol diacrylate, 51 parts 2-hydroxypropyl methacrylate, 0.01 parts parabenzoquinone, 0.05 parts butylated hydroxytoluene and 0.1 parts dibutyltin dilaurate. Isophorone diisocyanate (33 parts) was charged dropwise over a period of thirty minutes. The mixture stirred until an isocyanate content of less than 0.3 percent was obtained at which time 0.005 parts hydroquinone was added.

EXAMPLE 14

A mechanically stirred reaction vessel was charged with 21 parts trimethylolpropane triacrylate, 48 parts 2-hydroxypropyl methacrylate, 0.01 parts parabenzoquinone, 0.05 parts butylated hydroxytoluene and 0.1 parts dibutyltin dilaurate. Isophorone diisocyanate (38 parts) was charged dropwise over a period of thirty minutes. The mixture stirred until an isocyanate content of less than 0.3 percent was obtained at which time 0.005 parts hydroquinone was added.

EXAMPLE 15

A mechanically stirred reaction vessel was charged with 30 parts trimethylolpropane triacrylate, 33 parts 2-hydroxypropyl methacrylate, 0.01 parts parabenzoquinone, 0.05 parts butylated hydroxytoluene and 0.1 parts dibutyltin dilaurate. A trimmer of hexamethylene diisocyanate (33 parts), available as Desmodur N3300, was charged dropwise over a period of thirty minutes. The mixture stirred until an isocyanate content of less than 0.3 percent was obtained at which time 0.005 parts hydroquinone was added.

EXAMPLE 16

A mechanically stirred reaction vessel was charged with 20 parts hexanediol diacrylate, 45 parts 2-hydroxypropyl methacrylate, 0.01 parts parabenzoquinone, 0.05 parts butylated hydroxytoluene and 0.1 parts dibutyltin dilaurate. Desmodur W (35 parts), $H_{12}$MDI, was charged dropwise over a period of thirty minutes. The mixture stirred until an isocyanate content of less than 0.3 percent was obtained at which time 0.005 parts hydroquinone was added.

EXAMPLE 17

A mechanically stirred reaction vessel was charged with 20 parts butanediol diacrylate, 45 parts 2-hydroxypropyl methacrylate, 0.01 parts parabenzoquinone, 0.05 parts butylated hydroxytoluene and 0.1 parts dibutyltin dilaurate. Desmodur W (35 parts), $H_{12}$MDI, was charged dropwise over a period of thirty minutes. The mixture stirred until an isocyanate content of less than 0.3 percent was obtained at which time 0.005 parts hydroquinone was added.

EXAMPLE 18

A mechanically stirred reaction vessel was charged with 25 parts trimethylolpropane triacrylate, 43 parts 2-hydroxypropyl methacrylate, 0.01 parts parabenzoquinone, 0.05 parts butylated hydroxytoluene, and 0.1 parts dibutylin dilaurate. Desmodur W (32 parts), $H_{12}MDI$, was charged dropwise over a period of thirty minutes. The mixture stirred until an isocyanate content of less than 0.3 percent was obtained at which time 0.005 parts hydroquinone was added.

EXAMPLE 19

The product from Example 4 (45 parts) was combined with the product from Example 12 (27 parts), hexanediol diacrylate (8 parts) and 2-hydroxylethyl methacrylate (20 parts).

EXAMPLE 20

The product from Example 7 (45 parts) was combined with the product from Example 12 (27 parts), hexanediol diacrylate (8 parts) and 2-hydroxylethyl methacrylate (20 parts).

EXAMPLE 21

The product from Example 7 (45 parts) was combined with the product from Example 16 (27 parts), hexanediol diacrylate (8 parts) and 2-hydroxylethyl methacrylate (20 parts).

EXAMPLE 22

The product from Example 9 (41 parts) was combined with the product from Example 14 (25 parts), trimethylolpropane triacrylate (12 parts) and 2-hydroxylethyl methacrylate (22 parts).

EXAMPLE 23

The product from Example 5 (36 parts) was combined with the product from Example 14 (23 parts), trimethylolpropane triacrylate (15 parts) and 2-hydroxylethyl methacrylate (26 parts).

EXAMPLE 24

The product from Example 5 (36 parts) was combined with the product from Example 18 (24 parts), trimethylolpropane triacrylate (143 parts) and 2-hydroxylethyl methacrylate (26 parts).

EXAMPLE 25

The product from Example 5 (36 parts) was combined with the product from Example 15 (26 parts), trimethylolpropane triacrylate (12 parts) and 2-hydroxylethyl methacrylate (26 parts).

EXAMPLE 26

The product from Example 2 (32 parts) was combined with the product from Example 14 (21 parts), trimethylolpropane triacrylate (19 parts) and 2-hydroxylethyl methacrylate (28 parts).

EXAMPLE 27

The product from Example 2 (32 parts) was combined with the product from Example 18 (22 parts), trimethylolpropane triacrylate (18 parts) and 2-hydroxylethyl methacrylate (28 parts).

EXAMPLE 28

The product from Example 2 (32 parts) was combined with the product from Example 15 (23 parts), trimethylolpropane triacrylate (17 parts) and 2-hydroxylethyl methacrylate (28 parts).

EXAMPLE 29

The product from Example 11 (36 parts) was combined with the product from Example 4 (23 parts), trimethylolpropane triacrylate (15 parts) and 2-hydroxylethyl methacrylate (26 parts).

EXAMPLE 30

The product from Example 8 (45 parts) was combined with the product from Example 13 (27 parts), butanediol diacrylate (8 parts) and 2-hydroxylethyl methacrylate (20 parts).

EXAMPLE 31

The product from Example 8 (45 parts) was combined with the product from Example 17 (28 parts), butanediol diacrylate (7 parts) and 2-hydroxylethyl methacrylate (20 parts).

EXAMPLE 32

For comparative purposes, a styrenated unsaturated polyester resin was prepared according to the following procedure. A mechanically stirred reaction vessel was charged with 3 parts neopentyl glycol and 3 parts water (to make a neopentyl glycol/water slurry), 9 parts propylene glycol, 2 parts adipic acid, 31 parts isophthalic acid and 0.03 parts butylstannoic acid. The reaction mixture was heated to 220° C. under an atmosphere of nitrogen until an acid number of less than 10 was reached, at which time the vessel was then cooled to 150° C. Molten maleic anhydride (21 parts) and 0.23 parts piperidine were then delivered to the reactor. The mixture was heated to 200° C. and reacted until an acid number of 26 was obtained. The viscosity of the polymer was 25 Poise at 135° C. measured by a cone and plate viscometer. The polymer had Mw=4600, Mn=2300 and Mw/Mn=2.0. The liquid polymer was then dissolved in styrene containing 150 ppm toluhydroquinone to obtain 60 percent solids and 40 percent styrene.

EXAMPLE 33

The polymer of Example 1 (40 parts) was dissolved in 30 parts hexanediol diacrylate (HDDA) and 30 parts 2-hydroxyethyl methacrylate (HEMA). The following inhibitors were delivered to the reactive diluent to obtain the desired concentration in the polymer solution: 5 ppm 8% copper naphthenate and 50 ppm methyl ether hydroquinone. This resin lacked the urethane (meth)acrylate component.

Several of these examples were tested for various properties, and the test results are shown and described in the following Tables 1-4.

TABLE 1

| Example | 19 | 20 | 21 | 22 | 23 | 24 | 25 | 26 | 27 | 28 | 29 | 30 | 31 |
|---|---|---|---|---|---|---|---|---|---|---|---|---|---|
| Flexural Strength (psi) | 14442 | 18586 | 18283 | 16545 | 17426 | 17413 | 15357 | 19743 | 18846 | 18959 | 18699 | 17546 | 17358 |
| Flexural Modulus ($\times 10^5$ psi) | 3.8 | 4.8 | 4.8 | 5.9 | 5.3 | 5.1 | 4.6 | 5.9 | 5.8 | 5.4 | 5.3 | 5.4 | 5.2 |
| Tensile Strength (psi) | 8027 | 11004 | 8089 | 10000 | 8469 | 7517 | 8400 | 10852 | 9691 | 9403 | 10363 | 8757 | 9908 |
| Tensile Modulus ($\times 10^5$ psi) | 4.1 | 4.8 | 4.8 | 5.7 | 5.3 | 5.1 | 4.7 | 5.9 | 5.9 | 5.3 | 5.4 | 5.1 | 5.0 |
| Elongation (%) | 6.7 | 3.7 | 2.3 | 2.3 | 2.2 | 1.9 | 2.7 | 2.4 | 2.2 | 2.2 | 2.6 | 2.1 | 2.7 |
| Heat Distortion Temp. (° C.) | 70 | 83 | 80 | 87 | 85 | 87 | 83 | 90 | 85 | 85 | 87 | 87 | 82 |
| Barcol | 38 | 40 | 38 | 50 | 49 | 46 | 39 | 50 | 49 | 46 | 49 | 42 | 44 |
| Viscosity (cP) | 500 | 325 | 350 | 450 | 400 | 450 | 450 | 450 | 500 | 500 | 300 | 300 | 325 |
| Color (APHA or Gardner) | 63 | G2 | G2 | G2 | 65 | 60 | 85 | 110 | 60 | G2 | 84 | G2 | G2 |
| Unsaturated Polyester Type[1] | HHPA | DCPD | DCPD | DCPD | HHPA | HHPA | HHPA | IPA | IPA | IPA | HHPA[4] | DCPD | DCPD |
| Multifunctional (meth)acrylate[2] | HDDA | HDDA | HDDA | TMPTA | TMPTA | TMPTA | TMPTA | TMPTA | TMPTA | TMPTA | TMPTA | BDDA | BDDA |
| Urethane (meth)acrylate[3] | IPDI | IPDI | $H_{12}$MDI | IPDI | IPDI | $H_{12}$MDI | TriHDI | IPDI | $H_{412}$MDI | TriHDI | IPDI | IPDI | $H_{12}$MDI |
| Hydroxy (meth)acyrylate | HEMA | HEMA | HEMA | HEMA | HEMA | HEMA | HEMA | HEMA | HEMA | HEMA | HEMA | HEMA | HEMA |
| Multifunctional (meth)acrylate (%) | 21 | 21 | 21 | 24 | 27 | 27 | 27 | 30 | 30 | 30 | 27 | 21 | 21 |
| HEMA (%) | 20 | 20 | 20 | 22 | 26 | 26 | 26 | 28 | 28 | 28 | 26 | 20 | 20 |
| Urethane (meth)acrylate (%) | 23 | 23 | 23 | 21 | 18 | 18 | 18 | 16 | 16 | 16 | 16 | 23 | 23 |
| Polyester Solids (%) | 36 | 36 | 36 | 33 | 29 | 29 | 29 | 26 | 26 | 26 | 26 | 36 | 36 |

Table 1: Solution properties of the liquid resins and mechanical properties of the cured products. Mechanical properties were obtained on ⅛" non-reinforced cured resin samples that were catalyzed with 0.05% DMA, 0.25% Co-12 and 1.25% MEKP-9, post cured 5h at 100° C. Mehcanical tests were performed according to the following ASTM methods: flexural tests by ASTM D-790; tensile tests by ASTM D-638; barcol by ASTM D-2583; and heat distortion temperature by ASTM D-648.
[1]IPA = isophthalic acid; HHPA = hexahydrophthalic anhydride; DCPD = dicyclopentadiene.
[2]TMPTA = trimethylolpropane triacrylate; HDDA = hexanediol diacrylate; BDDA = butanediol diacrylate.
[3]These urethane (meth)acrylates are the reaction products of isocyanates and hydroxypropyl methacrylate. The isocyanate precursors are listed: IPDI, $H_{12}$MDI, and TriHDI, which is a trimer of hexamethylene diisocyanate.
[4]This HHPA-based unsaturated polyester is modified with allyl glycidyl ether.

TABLE 2

| Example[1] | Exposure Type | Hours of Exposure | L* | a* | b* | ΔL | Δa | Δb | ΔE | CMC ΔE | % Gloss Retention |
|---|---|---|---|---|---|---|---|---|---|---|---|
| 19 | None | 0 | 93.43 | 0.26 | 2.97 | | | | | | |
| 19 | QUV-B | 240 | 94.81 | −0.24 | 3.27 | 1.38 | −0.50 | 0.30 | 1.50 | 1.22 | 93.3 |
| 19 | QUV-A | 1000 | 95.14 | −0.07 | 2.51 | 1.71 | −0.33 | −0.46 | 1.80 | 1.38 | 60.1 |
| 26 | None | 0 | 93.82 | −0.23 | 3.22 | | | | | | |
| 26 | QUV-B | 240 | 94.94 | −0.39 | 3.80 | 1.12 | −0.16 | 0.57 | 1.27 | 1.06 | 96.6 |
| 26 | QUV-A | 1000 | 95.31 | −0.22 | 3.18 | 1.49 | 0.01 | −0.04 | 1.49 | 1.03 | 73.9 |
| 32 | None | 0 | 95.94 | 0.10 | 1.35 | | | | | | |
| 32 | QUV-B | 240 | 94.85 | −1.63 | 10.83 | −1.09 | −1.74 | 9.49 | 9.70 | 13.37 | 86.7 |
| 32 | QUV-A | 1000 | 94.90 | −0.73 | −5.82 | −1.04 | −0.83 | 7.17 | 7.29 | 9.47 | 72.8 |
| 33 | None | 0 | 92.74 | −0.16 | 3.55 | | | | | | |
| 33 | QUV-B | 240 | 94.89 | −0.50 | 4.11 | 2.15 | −0.34 | 0.57 | 2.25 | 1.69 | 94.0 |
| 33 | QUV-A | 1000 | 95.35 | 0.08 | 2.22 | 1.92 | −0.18 | −0.75 | 2.07 | 1.61 | 73.3 |

Table 2. Weathering data of examples that illustrate preferred embodiments (Examples 19 and 26) of this invention and comparative Examples 32 and 33.
All examples were formulated as white gel coats (15% $TiO_2$) and other additives including, promoters, accelerators, thixotropic additives and others. None of the examples contained UV absorbers, hindered amine light stabilizers or other additives intended to enhance UV stability.

TABLE 3

| Example[1] | Test Result |
| --- | --- |
| 19 | No blistering |
| 26 | No blistering |
| 32 | Minimal blistering |
| 33 | Medium-sized blisters, fiber tracking |

Table 3. Hydrolytic stability test results of examples illustrating preferred embodiments (Examples 19 and 26) and comparative Examples 32 and 33.
Notes:
[1]All examples were formulated as white gel coats (15% $TiO_2$) with other additives including promoters, accelerators, thixotropic additives and others.

TABLE 4

| Example | 32 | 33 |
| --- | --- | --- |
| Barcol | 43 | 27 |
| Flexural Strength (psi) | 19481 | 10655 |
| Flexural Modulus ($\times 10^5$ psi) | 5.3 | 3.0 |
| Tensile Strength (psi) | 11813 | 6083 |
| Tensile Modulus ($\times 10^5$ psi) | 5.3 | 3.4 |
| Elongation (%) | 3.3 | 14.2 |
| Heat Distortion Temp. (° C.) | 93 | 48 |

Table 4: Comparative mechanical testing data of styrenated unsaturated polyester resins and non-styrenated unsaturated polyester resins lacking one of the four essential components described in the present invention. Mechanical testing was performed according to the formula, post cure and ASTM methods listed in Table 1.

This invention has been described in detail with particular reference to certain embodiments, but variations and modifications can be made without departing from the spirit and scope of the invention.

What is claimed is:

1. A styrene-free, unsaturated polyester resin composition consisting essentially of:
   A. an unsaturated polyester not derived from dicyclopentadiene;
   B. a urethane (meth)acrylate;
   C. a hydroxyl-functionalized (meth)acrylate monomer; and
   D. a multifunctional (meth)acrylate monomer,
      wherein the resin composition is curable under an air atmosphere at ambient temperatures and contains less than about 3 weight percent of hazardous air pollutants.

2. A composition as defined by claim 1 wherein the unsaturated polyester has a weight average molecular weight from about 1000 to about 12000.

3. A composition as defined by claim 1 wherein the unsaturated polyester has a weight average molecular weight from about 1500 to about 8000.

4. A composition as defined by claim 1 wherein the urethane (meth)acrylate is a product of a difunctional or polyfunctional isocyanate with a hydroxyl-functionalized (meth)acrylate.

5. A composition as defined by claim 1 wherein the urethane (meth)acrylate is present in an amount from about 10 to about 40 percent by weight.

6. A composition as defined by claim 1 wherein the hydroxyl-functionalized (meth)acrylate monomer is present in an amount from about 5 to about 40 percent by weight.

7. A composition as defined by claim 1 wherein the multifunctional (meth)acrylate monomer is selected from the group consisting of 1,4-butanediol diacrylate, 1,6-hexanediol diacrylate, diethylene glycol diacrylate, 1,3-butylene glycol diacrylate, neopentyl glycol diacrylate, cyclohexane dimethanol diacrylate, dipropylene glycol diacrylate, ethoxylated bisphenol A diacrylate, trimethyloipropane, triacrylate, pentaerytbritol triacrylate, pentaerythritol tetracrylate, the methacrylate analogues of such monomers and a mixture thereof.

8. A composition as defined by claim 1 wherein the multifunctional (meth)acrylate monomer is present in an amount from about 5 to about 40 percent by weight.

9. A composition as defined by claim 1 wherein the unsaturated polyester is present in an amount from about 20 to about 70 percent by weight.

10. A composition as defined by claim 1 wherein the hydroxyl-functionalized (meth)acrylate monomer is selected from the group consisting of 2-hydroxyethyl methacrylate, 2-hydroxylpropyl methacrylate, 2-hydroxylpropyl acrylate and mixtures thereof.

11. A composition as defined by claim 1 wherein the unsaturated polyester has an acid number of less than about 50.

12. A composition as defined by claim 1 wherein the unsaturated polyester is at least partially derived from an epoxy allyl ether or a hydroxyl-functionalized allyl ether.

13. A composition as defined by claim 12 wherein the epoxy allyl ether or hydroxyl-functionalized allyl ether is used in an amount up to about 30 percent, by weight, based on an initial polyester synthesis charge.

14. A composition as defined by claim 1 wherein the unsaturated polyester is at least partially derived from an epoxy functionalized (meth)acrylate.

15. A composition as defined by claim 14 wherein the epoxy functionalized (meth)acrylate is used in an amount up to about 30 percent by weight, based on an initial polyester synthesis charge.

16. A composition as defined by claim 1 wherein the urethane (meth)acrylate is derived from an aliphatic isocyanate.

17. A composition as defined by claim 1 which contains up to about 10 percent by weight of a thixotropic agent.

18. A composition as defined by claim 1 which contains up to about 40 percent by weight of a pigment.

19. A composition as defined by claim 1 which contains up to about 5 percent by weight of a suppressant.

20. A composition as defined by claim 1 which contains up to about 10 percent by weight of an ultraviolet light absorber or ultraviolet light stabilizer.

21. A composition as defined by claim 1 wherein the resin composition is cured by a free-radical initiator.

22. A process for the manufacture of a styrene-free, unsaturated polyester resin composition, wherein the process consists essentially of mixing:
   A. an unsaturated polyester not derived from cyclopentadiene;
   B. a urethane (meth)acrylate;
   C. a hydroxyl-functionalized (meth)acrylate monomer; and
   D. a multifunctional (meth)acrylate monomer,
      wherein the resin composition is curable under an air atmosphere at ambient temperatures and contains less than about 3 weight percent of hazardous air pollutants.

* * * * *